US012335691B2

(12) United States Patent
Probst et al.

(10) Patent No.: US 12,335,691 B2
(45) **Date of Patent: *Jun. 17, 2025**

(54) BATTERY COMPARTMENT OF A HEARING DEVICE CONFIGURED TO INHIBIT THE INGRESS OF DEBRIS INTO THE BATTERY COMPARTMENT

(71) Applicant: SONOVA AG, Staefa (CH)

(72) Inventors: Daniel Probst, Uerikon (CH); Andre Ochsenbein, Wolfhausen (CH)

(73) Assignee: Sonova AG, Staefa (CH)

( * ) Notice: Subject to any disclaimer, the term of this patent is extended or adjusted under 35 U.S.C. 154(b) by 14 days.

This patent is subject to a terminal disclaimer.

(21) Appl. No.: 18/212,874

(22) Filed: Jun. 22, 2023

(65) Prior Publication Data

US 2023/0336930 A1 Oct. 19, 2023

Related U.S. Application Data

(63) Continuation of application No. 17/709,619, filed on Mar. 31, 2022, now Pat. No. 11,729,560.

(51) Int. Cl.
*H04R 25/00* (2006.01)

(52) U.S. Cl.
CPC ......... *H04R 25/602* (2013.01); *H04R 25/604* (2013.01); *H04R 2225/31* (2013.01)

(58) Field of Classification Search
CPC . H04R 25/602; H04R 25/604; H04R 2225/31
See application file for complete search history.

(56) References Cited

U.S. PATENT DOCUMENTS

| | | | | |
|---|---|---|---|---|
| 6,354,990 | B1 * | 3/2002 | Juneau | C07D 493/10 600/25 |
| 6,430,296 | B1 * | 8/2002 | Olsen | H04R 25/602 381/328 |
| 6,567,527 | B1 | 5/2003 | Baker et al. | |
| 2005/0123157 | A1 | 6/2005 | Kragelund et al. | |
| 2006/0215863 | A1 | 9/2006 | Sauer | |
| 2016/0080872 | A1 | 3/2016 | Schennib | |
| 2020/0236478 | A1 | 7/2020 | Frei et al. | |

* cited by examiner

*Primary Examiner* — Suhan Ni
(74) *Attorney, Agent, or Firm* — ALG Intellectual Property, LLC

(57) ABSTRACT

Described is a hearing device configured to be worn by a user, the hearing device having a battery compartment configured to house a battery and a microphone, wherein the battery compartment is located in a housing. The housing includes: a casing configured to form the battery compartment; and a lid member having a hinged end pivotally connected to the casing such that the lid member is configured to pivot between an open position and a closed position relative to the casing; wherein the lid member is formed to define an opening through the lid member; wherein, when the lid member is in the closed position, the opening is configured to allow the microphone to be in air communication with ambient air.

14 Claims, 5 Drawing Sheets

BATTERY COMPARTMENT OF A HEARING DEVICE CONFIGURED TO INHIBIT THE INGRESS OF DEBRIS INTO THE BATTERY COMPARTMENT

RELATED APPLICATIONS

This application is a continuation application of U.S. patent application Ser. No. 17/709,619, filed Mar. 31, 2022 which is hereby incorporated by reference in its entirety.

BACKGROUND INFORMATION

A hearing device may enable or enhance hearing by a user wearing the hearing device by providing audio content received by the hearing device to the user. For example, a hearing aid may provide an amplified version of the audio content in the form of environmental sound at the location of the user to the user to enhance hearing by the user. A hearing device may further provide audio content to the user based on an audio stream (e.g., an electrical audio signal) received by the hearing device from a streaming source (e.g. a table microphone or a streaming service). As another example, a hearing device may include a cochlear implant system and a sound processor included in the cochlear implant system may provide electrical stimulation representative of the audio content to the user to enable hearing by the user.

A hearing device may include a battery compartment that is configured to house a battery and/or a microphone. In some cases, the battery compartment may include one or more openings for operation of the battery and/or the microphone. Unfortunately, these openings may allow debris (e.g., sweat, wax, hair, skin particles, etc.) contained in an ear canal of the user to enter the battery compartment, which may obstruct, degrade, or damage the battery and/or the microphone.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
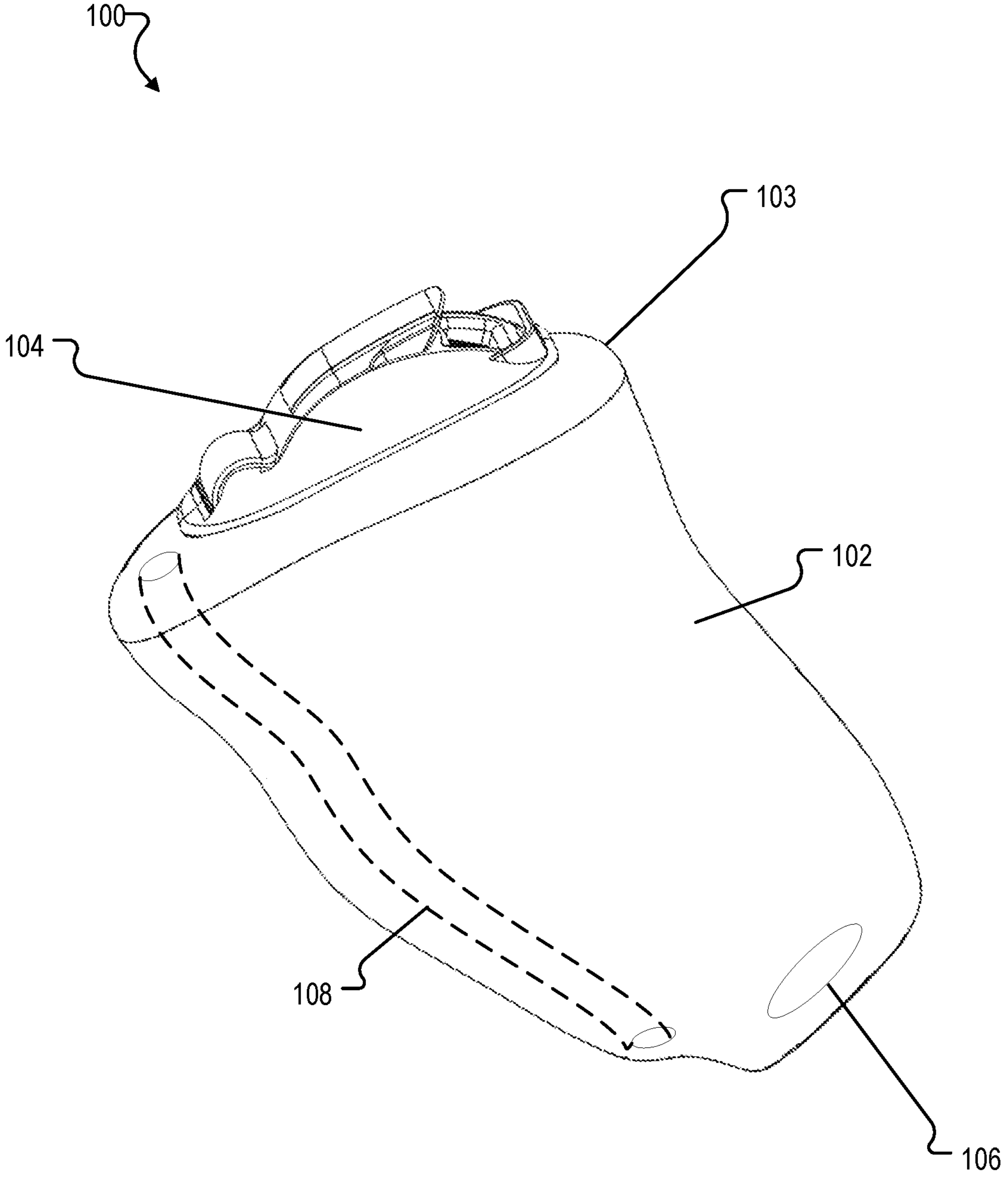
FIG. 1 shows a perspective view an illustrative implementation of a hearing device.

An illustrative hearing device may include a battery compartment comprising a battery and a microphone. The battery compartment may be located in a housing comprising a casing configured to form the battery compartment and a lid member having an opening defined through the lid member to the battery compartment.

For example, a hearing device configured to be worn by a user may include a battery compartment comprising a battery and a microphone. The battery compartment may be located in a housing. The housing may comprise a casing configured to form the battery compartment and a lid member having a hinged end pivotally connected to the casing such that the lid member is configured to pivot between an open position and a closed position relative to the casing. The lid member may be formed to define an opening through the lid member such that, when the lid member is in the closed position, the opening may be configured to allow the microphone and the battery to be in air communication with ambient air.

In some implementations, the hearing device may include a seal positioned about a periphery of the lid member and configured to seal the lid member relative to the casing when the lid member is in the closed position. For example, the opening may be configured to provide a sound path to the microphone and an air flow path to the battery when the lid member is in the closed position. The hearing device may additionally include a filter coupled with the lid member to entirely cover the opening.

The principles described herein may result in improved hearing devices compared to conventional devices that do not include an opening defined through a lid member of a battery compartment, as well as provide other benefits as described herein. For example, a hearing device having an opening defined through a lid member of a battery compartment may provide an ambient air flow path for a battery and a sound path to a microphone housed within the battery compartment, while inhibiting the ingress of debris into the battery compartment. To illustrate, the opening defined through the lid member may be positioned above a hinged end of the lid member relative to a transverse plane of a head of the user when the hearing device is at least partially positioned within an ear canal of the user. This may position the opening in a top portion of the ear canal, which may contain less debris than a bottom portion of the ear canal, to inhibit the ingress of debris into the battery compartment.

In instances where the hearing device includes a seal positioned about a periphery of the lid member, the seal may be configured to seal the battery compartment to inhibit the ingress of debris into the battery compartment. In instances where the hearing device includes a filter covering the opening of the lid member, the filter may further inhibit the ingress of debris into the battery compartment. For example, the filter may be configured to allow ambient air to flow through the opening while inhibiting debris from entering the opening. The reduction or elimination of the ingress of debris to the battery compartment may improve the quality and/or life of the battery and microphone stored within the battery compartment.

In some scenarios, a hearing device having an opening defined through a lid member of a battery compartment may further reduce or eliminate acoustic feedback within the hearing device. For example, the opening through the lid member may be spaced away from a vent channel of the hearing device configured to allow air leakage out of an ear canal of the user while the hearing device is being worn (e.g., to reduce an occlusion effect that may be caused by hearing device at least partially positioned within an ear canal of the user). This may reduce or eliminate acoustic feedback that may be caused by acoustic leakage through the vent channel. Additionally, in instances where the hearing device includes a seal positioned about a periphery of the lid member, the seal may be configured to acoustically seal the battery compartment such that the microphone is configured to receive sound entirely through the opening. This may inhibit the microphone from receiving sound or acoustic feedback inadvertently through another pathway within the hearing device (e.g., through a slight opening between the lid member and the casing).

Various embodiments will now be described in more detail with reference to the figures. The systems, hearing devices, and methods described herein may provide one or more of the benefits mentioned above and/or various additional and/or alternative benefits that will be made apparent herein.

FIG. 1 shows an illustrative implementation 100 of a hearing device 102 configured to be worn by a user. Hearing device 102 herein is to be understood as any device configured to output sound to a user that includes components that are worn at least partially in an ear canal of a user. In particular, hearing device 102 may be implemented as a hearing aid or a hearing instrument configured to enable or enhance hearing by a user wearing hearing device 102. For example, hearing device 102 may be implemented by a hearing aid configured to provide an amplified version of audio content to a user, a sound processor included in a cochlear implant system configured to provide electrical stimulation representative of audio content to a user, a sound processor included in a bimodal hearing system configured to provide both amplification and electrical stimulation representative of audio content to a user, or any other suitable hearing prosthesis. As described herein, hearing device 102 may include one or more components configured to be at least partially positioned within an ear canal of the user.

For example, hearing device 102 may be used to improve the hearing capability or communication capability of a user, for instance by compensating a hearing loss of a hearing-impaired user, in which case hearing device 102 is commonly referred to as a hearing instrument such as a hearing aid or hearing prosthesis. Hearing device 102 may also be used to output sound based on an audio signal, which may be communicated by a wire or wirelessly to hearing device 102. Hearing device 102 may also be used to reproduce a sound in a user's ear canal detected by a microphone. The reproduced sound may be amplified to account for a hearing loss, such as in a hearing instrument, or may be output without accounting for a hearing loss, for instance to provide for a faithful reproduction of detected ambient sound and/or to add sound features of an augmented reality in the reproduced ambient sound, such as in a hearable. Hearing device 102 may also provide for a situational enhancement of an acoustic scene, e.g. beamforming and/or active noise cancelling (ANC), with or without amplification of the reproduced sound. Hearing device 102 may also be implemented as a hearing protection device, such as an earplug, configured to protect the user's hearing. In some implementations, hearing devices 102 may be configured to be worn at an ear and may be implemented by earbuds, earphones, hearables, and hearing instruments such as receiver-in-the-canal (RIC) hearing aids, behind-the-ear (BTE) hearing aids, in-the-ear (ITE) hearing aids, invisible-in-the-canal (IIC) hearing aids, completely-in-the-canal (CIC) hearing aids, cochlear implant systems configured to provide electrical stimulation representative of audio content to a user, a bimodal hearing system configured to provide both amplification and electrical stimulation representative of audio content to a user, or any other suitable hearing prostheses. A hearing system comprising two hearing devices 102 may be configured to be worn at different ears of the user, which is sometimes also referred to as a binaural hearing device.

As shown, hearing device 102 comprises an outer shell 103 forming a housing of hearing device 102. Hearing device 102 further includes a housing 104 including a battery compartment 116 (see e.g. FIGS. 3A and 3B) configured to house a microphone and a battery therein, a sound outlet 106 for outputting sound to an ear canal of the user, and a vent channel 108 extending through hearing device 102 to allow air leakage out of the ear canal of the user while hearing device 102 is being worn (e.g., to reduce an occlusion effect that may be caused by hearing device 102 being at least partially positioned within an ear canal of the user). Hearing device 102 may include additional or alternative components as may serve a particular implementation. Such additional or alternative components may comprise, for example, at least one of a processor, an output transducer, a power management system, a sensor (e.g., a physiological sensor) configured to detect a property (e.g., a physiological property) of a user and/or the ambient environment of the user, a communication interface (e.g., a Bluetooth radio), and/or a user interface (e.g., a push button) to control the hearing device 102.

Figure 2A:
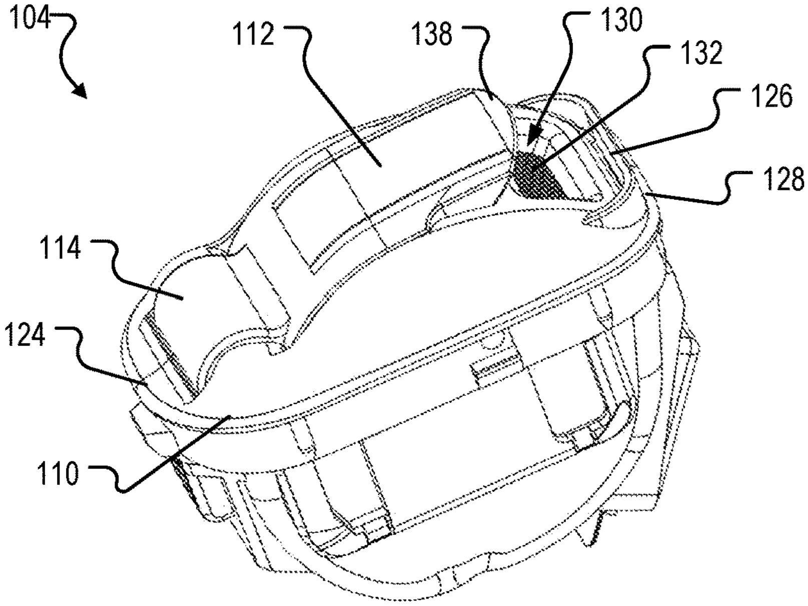
FIG. 2A shows a perspective view of an illustrative housing of the hearing device of FIG. 1.
Figure 2B:
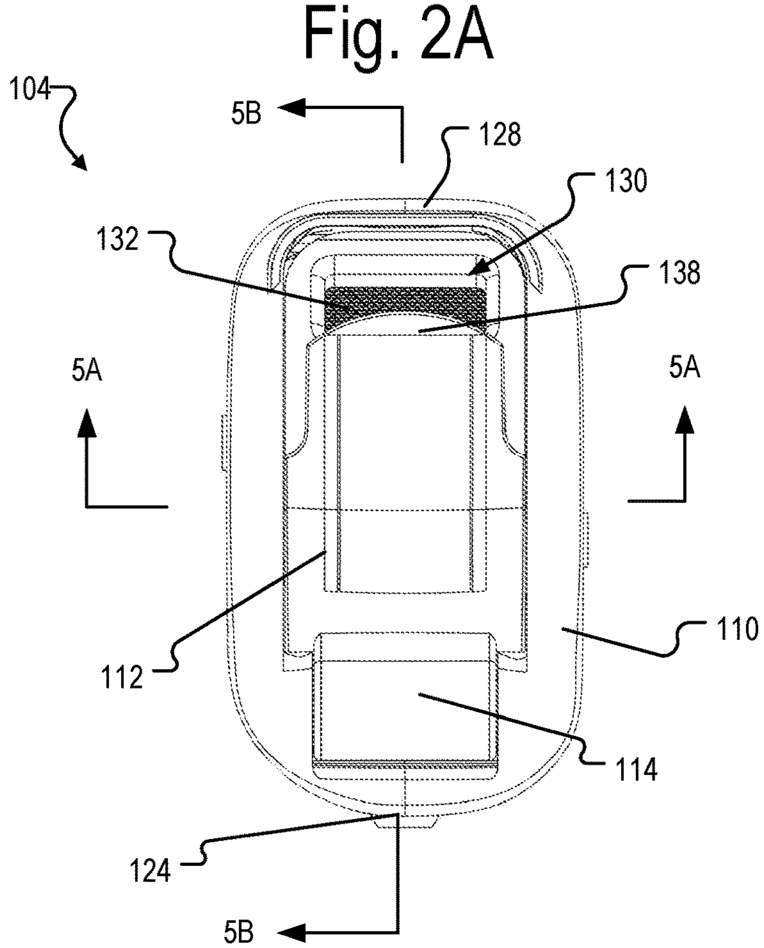
FIG. 2B shows a top plan view of the housing of FIG. 2A.

FIGS. 2A and 2B show an illustrative housing 104 including battery compartment 116 of hearing device 102. As shown, housing 104 comprises a casing 110 and a lid member 112. Casing 110 is formed to define a battery compartment 116 for receiving a microphone and a battery therein. Lid member 112 includes a hinged end 114 pivotally connected to casing 110 such that lid member 112 may be configured to pivot between an open position and a closed position relative to casing 110. When lid member 112 is in the closed position, lid member 112 may be configured to cover the battery compartment, and, when lid member 112 is in the open position, lid member 112 may be configured to uncover the battery compartment to provide access to the battery and/or microphone. In some implementations, lid member 112 may be selectively removable from casing 110 and/or housing 104 may be selectively removable from hearing device 102 (e.g., to aid with cleaning and/or replacement of one or more components of hearing device 102). In particular, housing 104 may form an insert that may be removably inserted into a correspondingly configured receptacle of hearing device 102. In some implementations, the battery compartment may form by a module, which may be removably inserted into housing 104 that may be retained within an opening of housing 104.

Figure 3A:
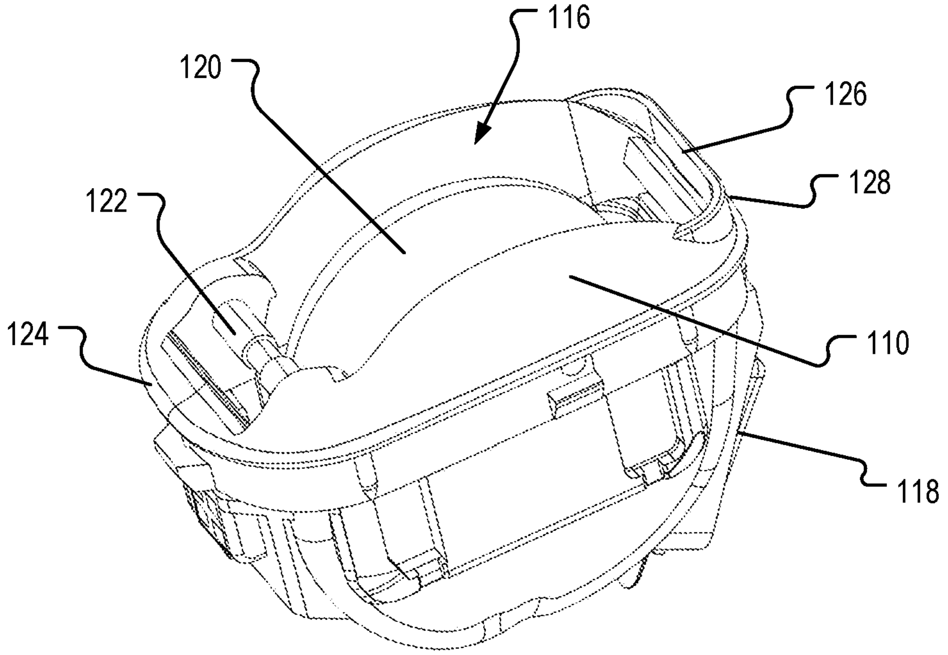
FIG. 3A shows a perspective view of the housing of FIG. 2A with a lid member of the housing removed for illustrative purposes.
Figure 3B:
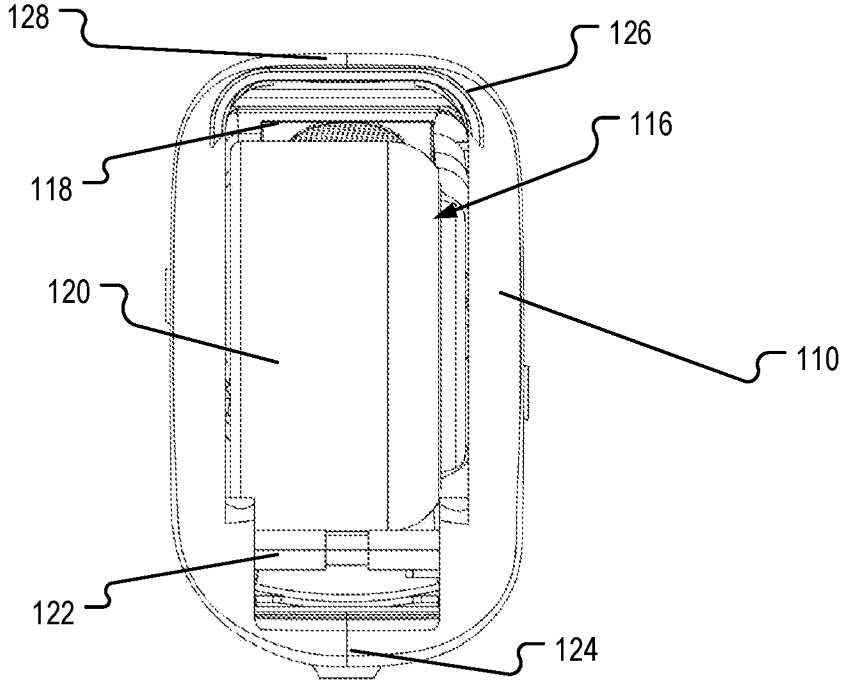
FIG. 3B shows a top plan view of the housing of FIG. 3A.

FIGS. 3A and 3B show casing 110 of housing 104 with lid member 112 removed for illustrative purposes. As shown, casing 110 is formed to define battery compartment 116 within casing 110 that may be configured to house a microphone 118 and a battery 120. In some implementations, casing 110 may be configured to receive additional components of hearing device 102 within battery compartment 116.

Microphone 118 may be implemented by one or more suitable audio detection devices configured to detect an audio signal presented to a user of hearing device 102. In particular, microphone 118 may include an electro acoustic transducer configured to convert an audio signal in the form of an acoustic signal (e.g., sound) into an electric audio signal (e.g., an electric signal comprising information representative of the acoustic signal). The audio signal may include, for example, audio content (e.g., music, speech, noise, etc.) generated by one or more audio sources included in an environment of the user. Microphone 118 may be included in or communicatively coupled to hearing device 102 in any suitable manner. In some implementations, microphone 118 may comprise a micro-electro-mechanical system (MEMS) microphone. Additionally or alternatively, an interface may be included to receive an audio stream such as an electrical audio signal from a streaming source (e.g., a table microphone and/or a streaming service).

Battery 120 may be implemented by any suitable device configured to supply power to one or more components of hearing device 102. In some implementations, battery 120 may comprise a zinc-air battery. In some cases, an ambient air flow path may be provided to microphone 118 and/or battery 120 for connecting microphone 118 and/or battery 120 to the ambient (e.g., for venting and/or cooling microphone 118 and/or battery). Such an ambient air flow path may further provide a sound inlet path for microphone 118 to transmit surrounding sound to microphone 118.

In some implementations, casing 110 may further include a hinge 122 for receiving hinged end 114 of lid member 112 to allow lid member 112 to pivot relative to casing 110 about hinge 122. Hinge 122 may be positioned at a first end portion 124 of casing 110 to position hinged end 114 of lid member 112 at first end portion 124 of casing 110. Casing 110 may additionally, in some implementations, comprise a rim 126 extending upwardly from casing 110 along a second end portion 128 of casing 110.

Figure 4A:
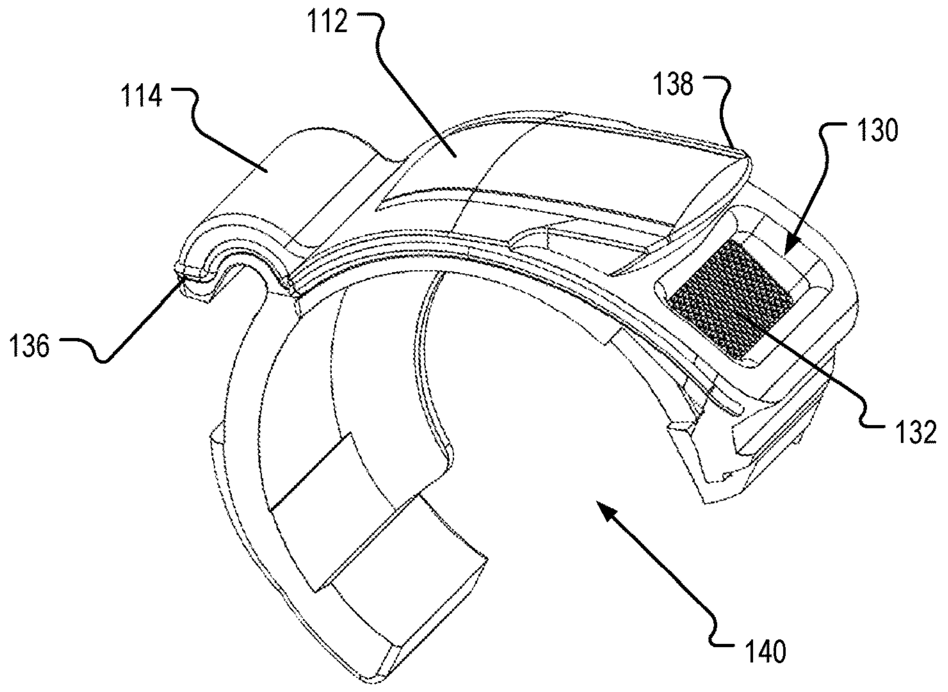
FIG. 4A shows a perspective view of the lid member of the housing of FIG. 2A.
Figure 4B:
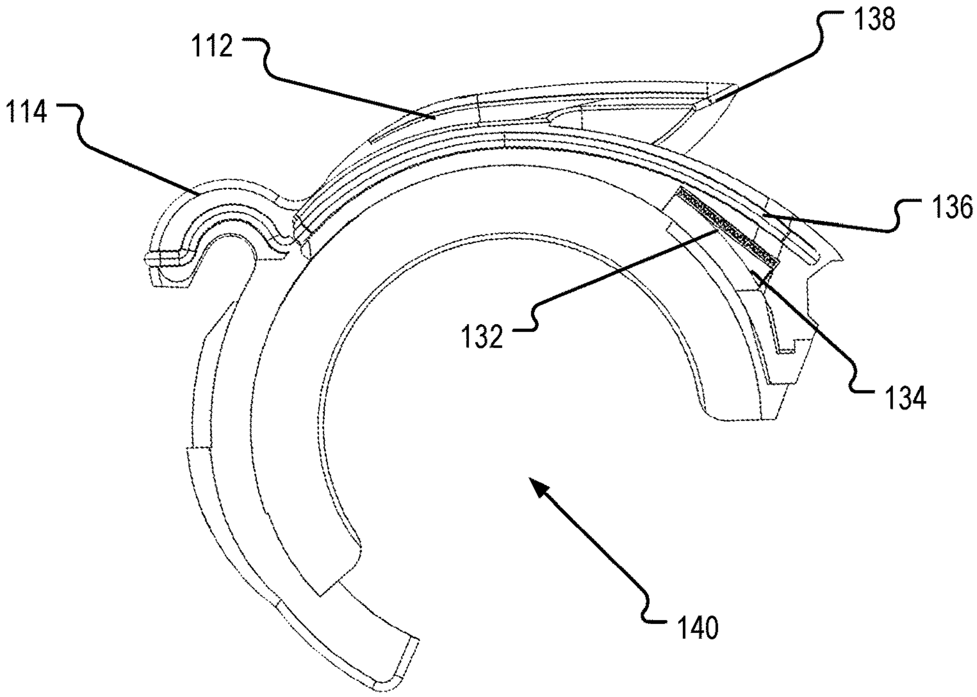
FIG. 4B shows a side elevational view of the lid member of FIG. 4A.

FIGS. 4A and 4B show lid member 112 in more detail. As shown, lid member 112 is formed to define an opening 130 through lid member 112. Opening 130 may be, when lid member 112 is in the closed position, in ambient air communication with microphone 118 and battery 120. Opening 130 may be spaced away from hinged end 114 of lid member 112. For example, when hinged end 114 is positioned at first end portion 124 of casing 110, opening 130 may be positioned at second end portion 128 of casing 110.

Lid member 112 may further comprise a filter 132 coupled with lid member 112 to entirely cover opening 130. Filter 132 may include a mesh material and/or any other suitable type of material configured to allow ambient air to flow through opening 130 while inhibiting debris from entering opening 130. In some implementations, filter 132 may be selectively removable from lid member 112. To illustrate, lid member 112 may include a slit 134 (e.g., an opening through a side surface of lid member 112) configured to slidingly receive filter 132 such that filter 132 may be slid into and/or out of slit 134. This may allow filter 132 to be removed from lid member 112 (e.g., to clean debris from filter 132 and/or exchange filter 132 with another filter 132). Still other suitable configurations for coupling filter 132 with lid member 112 may be used (e.g., a friction fit, a snap fit, etc.).

Figure 5A:
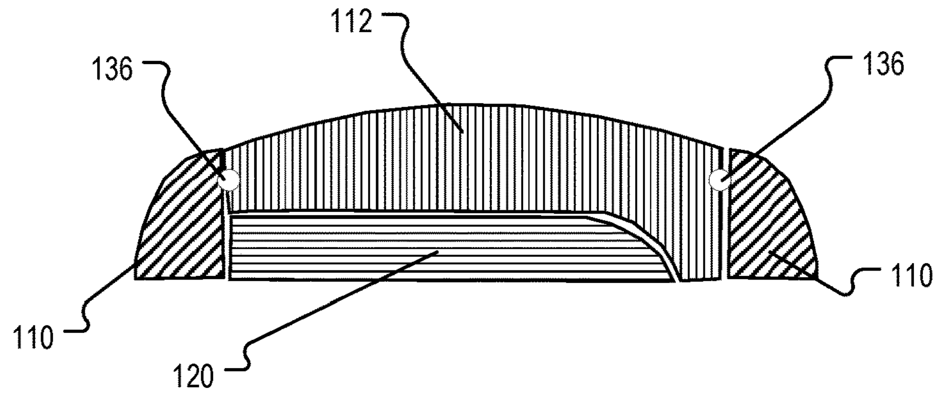
FIG. 5A shows a partial cross-sectional view of the housing of FIG. 2A taken along line 5A-5A of FIG. 2B.

Lid member 112 may further comprise a seal 136 positioned about a periphery of lid member 112. For example, seal 136 may extend about a portion of lid member 112 that is configured to abut casing 110 when lid member 112 is in the closed position to form a seal between lid member 112 and casing 110 (e.g., as shown in FIG. 5A). Seal 136 may be made from a compressible material (e.g., rubber, elastomers, polymers, plastic, etc.) configured to compress against casing 110 and seal lid member 112 relative to casing 110. For example, seal 136 may be configured to seal lid member 112 and/or opening 130 relative to battery compartment 116.

In some implementations, lid member 112 may include a flange 138 extending outwardly from an exterior surface of lid member 112 such as between hinged end 114 and opening 130. Flange 138 may be configured to provide a grip (e.g., a finger grip) for a user to engage for pivoting lid member 112 relative to casing 110. In some implementations, flange 138 may be configured to extend over a portion of opening 130 without entirely covering opening 130. Additionally, an interior surface of lid member 112 may form a recess 140 configured to receive battery 120. This may allow lid member 112 to support battery 120 within battery compartment 116 of casing 110. In some implementations, when lid member 112 is pivoted from the closed position to the open position, battery 120 may rotate simultaneously with lid member 112 away from battery compartment 116 to provide access to battery 120. Alternatively, battery 120 may remain in battery compartment 116 when lid member 112 is pivoted to the open position.

Figure 5B:
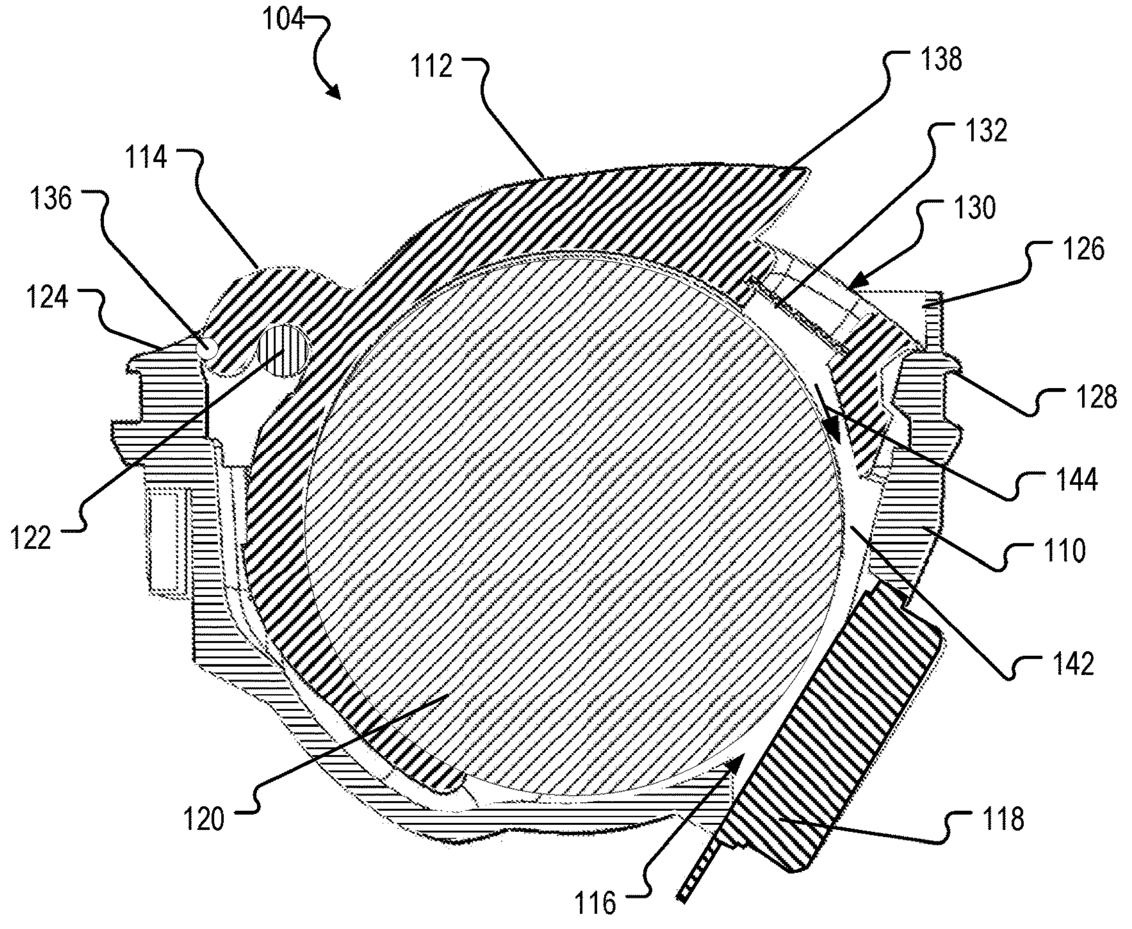
FIG. 5B shows a cross-sectional view of the housing of FIG. 2A taken along line 5B-5B of FIG. 2B.

FIG. 5B shows a cross-sectional view of housing 104 with lid member 112 positioned in the closed position relative to casing 110. As shown, lid member 112 is positioned to cover battery compartment 116 when lid member 112 is in the closed position relative to casing 110. In this configuration, lid member 112 of housing 104 may provide an ambient air flow path 142 for battery 120 and a sound path for microphone 118 housed within battery compartment 116, while inhibiting the ingress of debris into battery compartment 116.

For example, when lid member 112 is in the closed position, housing 104 may provide an ambient air flow path 142 that extends through opening 130, between casing 110 and battery 120, to microphone 118 (e.g., in a direction as shown by arrow 144). This may allow ambient air to flow to battery 120 and/or provide a sound path to microphone 118.

The position of opening 130 through lid member 112 may be configured to inhibit the ingress of debris into battery compartment 116. For example, opening 130 may be spaced away from hinged end 114 of lid member 112 such that when hinged end 114 is positioned at first end portion 124 of casing 110, opening 130 may be positioned at second end portion 128 of casing 110. This may allow opening 130 to be positioned above hinged end 114 of lid member 112 relative to a transverse plane of a head of a user when hearing device 102 is at least partially positioned within an ear canal of the user. Accordingly, opening 130 may be positioned in a top portion of the ear canal, which may contain less debris than a bottom portion of the ear canal, to inhibit the ingress of debris into battery compartment 116. Additionally, flange 138 of lid member 112 and/or rim 126 of casing 110 may extend outward relative to opening 130, which may further inhibit the ingress of debris into battery compartment 116 (e.g., flange 138 and/or rim 126 may obstruct or direct debris away from opening 130).

In instances where housing 104 includes seal 136 positioned about a periphery of lid member 112, seal 136 may seal battery compartment 116 to inhibit the ingress of debris into battery compartment 116. In instances where housing 104 includes filter 132 covering opening 130 of lid member 112, filter 132 may inhibit the ingress of debris into battery compartment 116 by obstructing debris from entering opening 130.

In some scenarios, housing 104 may further reduce or eliminate acoustic feedback within hearing device 102. For example, seal 136 be configured to acoustically seal opening 130 such that microphone 118 is configured to receive sound entirely through opening 130. This may inhibit microphone 118 from receiving sound or acoustic feedback inadvertently through another pathway within hearing device (e.g., through a slight opening between lid member 112 and casing 110). Additionally, when the hearing device is at least partially positioned within an ear canal of the user, an opening of vent channel 108 may be positioned below hinged end 114 of lid member 112 with respect to the transverse plane of the head of the user. This may space the opening vent channel 108 at a maximized distance away from opening 130 at second end portion 128 of casing 110, which may reduce or eliminate acoustic feedback that may be caused by acoustic leakage through vent channel 108.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A hearing device configured to be worn by a user, the hearing device having a battery compartment configured to house a battery and a microphone, wherein the battery compartment is located in a housing, the housing comprising:

a casing configured to form the battery compartment; and a lid member having a hinged end pivotally connected to the casing such that the lid member is configured to pivot between an open position and a closed position relative to the casing;

wherein the lid member is formed to define an opening through the lid member;

wherein, when the lid member is in the closed position, the opening is configured to allow the microphone to be in air communication with ambient air.

2. The hearing device of claim 1, wherein, when the lid member is in the closed position, the opening is configured to provide a sound path to the microphone and an air flow path to the battery.

3. The hearing device of claim 1, wherein, when the lid member is in the closed position, the lid member is configured to cover the battery compartment, and wherein, when the lid member is in the open position, the lid member is configured to uncover the battery compartment to provide access to the battery.

4. The hearing device of claim 1, further comprising a seal positioned about a periphery of the lid member and configured to seal the lid member relative to the casing.

5. The hearing device of claim 4, wherein the seal, when the lid member is in the closed position, is configured to seal the battery compartment to inhibit debris from entering the battery compartment.

6. The hearing device of claim 4, wherein the seal, when the lid member is in the closed position, is configured to acoustically seal the battery compartment such that the microphone is configured to receive sound entirely through the opening.

7. The hearing device of claim 1, wherein the lid member comprises a filter configured to entirely cover the opening, wherein the filter is configured to allow ambient air to flow through the opening while inhibiting debris from entering the opening.

8. The hearing device of claim 7, wherein the filter is selectively removable from the lid member.

9. The hearing device of claim 1, wherein the lid member is selectively removable from the casing.

10. The hearing device of claim 1, wherein the housing is selectively removable from the hearing device.

11. The hearing device of claim 1, wherein, when the hearing device is at least partially positioned within an ear canal of the user, the opening of the lid member is positioned above the hinged end of the lid member with respect to a transverse plane of a head of the user.

12. The hearing device of claim 11, wherein the hearing device further comprises a vent channel extending through the hearing device and configured to allow air leakage out of an ear canal of the user while the hearing device is being worn, wherein, when the hearing device is at least partially positioned within an ear canal of the user, an opening of the vent channel is positioned below the hinged end of the lid member with respect to the transverse plane of the head of the user.

13. The hearing device of claim 1, wherein the microphone comprises a micro-electro-mechanical system microphone.

14. The hearing device of claim 1, wherein the battery comprises a zinc-air battery.

* * * * *